June 25, 1968  V. J. LEONARD  3,390,399
OPTICAL RECORDER UTILIZING A FRESNEL/LENTICULAR LENS SYSTEM
Filed Jan. 11, 1967  3 Sheets-Sheet 1

INVENTOR.
VURNEN J. LEONARD
BY J. Donald Weber Jr.
ATTORNEY.

June 25, 1968 V. J. LEONARD 3,390,399
OPTICAL RECORDER UTILIZING A FRESNEL/LENTICULAR LENS SYSTEM
Filed Jan. 11, 1967 3 Sheets-Sheet 2

INVENTOR.
VURNEN J. LEONARD
BY J. Donald Weber Jr.
ATTORNEY.

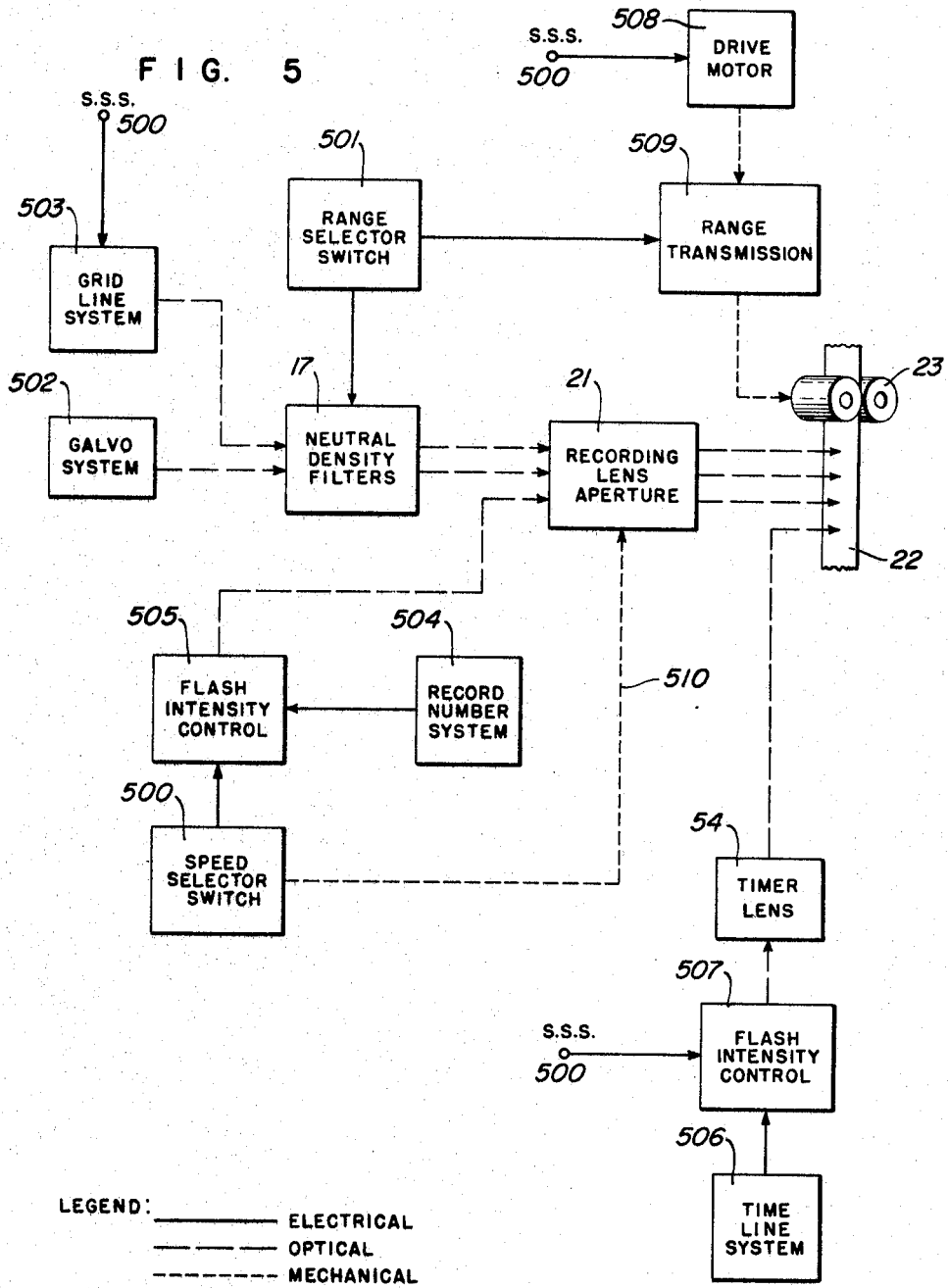

United States Patent Office 3,390,399
Patented June 25, 1968

3,390,399
OPTICAL RECORDER UTILIZING A FRESNEL/
LENTICULAR LENS SYSTEM
Vurnen J. Leonard, Littleton, Colo., assignor to
Honeywell Inc., Minneapolis, Minn., a corporation of Delaware
Filed Jan. 11, 1967, Ser. No. 608,525
6 Claims. (Cl. 346—109)

ABSTRACT OF THE DISCLOSURE

A unique optical system utilizing a Fresnel lens and a lenticular lens in conjunction with a dichroic filter as well as standard optical devices is utilized. The dichroic filter splits a beam of light in accordance with the radiant energy wave lengths and applies separate beams to different devices. The Fresnel/lenticular lens system operates upon one of the beams to provide a desirable output signal which is utilized to effect recording.

---

Recorders in use at the present time, particularly oscillographic recorders, operate at such high speeds that a great quantity of recording medium is utilized to accumulate data. Additionally, many of the recording processes are undesirable for purposes of producing a permanent record. Furthermore, many of the recording media are of the phosphor type wherein only a transient type of output or recordation is provided. Such a recorder is described in U.S. Patent 3,269,262, entitled Recorder, by R. S. Kampf and assigned to a common assignee.

The subject invention relates to a device which may be utilized in conjunction with recorders of the type suggested in order to produce a relatively permanent type of record as well as utilizing only a very small amount of recording medium. For example, the subject device records the information upon a standard light sensitive film such as Kodak Plus-X Pan or equivalent.

The subject invention utilizes a unique optical system wherein the light beam which produces the standard recording indicator is also utilized to produce the recording on the associated microfilm system. As noted, the unique optical system utilizes standard as well as unusual optical devices in a novel configuration. A dichroic lens splits the standard indicating beam whereby one portion of the spectrum performs the standard recording functions. The other portion of the beam is supplied, inter alia, through a Fresnel and lenticular lens system whereby highly desirable characteristics of the light beam are utilized. The other portion, after operation thereupon, produces the microfilm recording.

Consequently, it is one object of this invention to provide a unique optical system.

Another object of this invention is to provide means for selectively monitoring data produced by a recording apparatus and recording the monitored data on a recording medium.

Another object of this invention is to provide a substantially permanent recording means employing a photographic recording system.

Another object of this invention is to provide an optical system for providing a permanent record of data or information, for example in analog form, through the means of a novel optical system which does not interfere with a separate recording operation.

These and other objects and advantages of this invention will become more readily apparent when the following description is read in conjunction with the attached drawings, in which:

FIGURE 1 s a schematic representation of a preferred embodiment of the optical system of the instant invention;

FIGURE 5 is a block diagram of the recording system shown in FIGURE 4 including the controls associated therewith.

Figure 1:
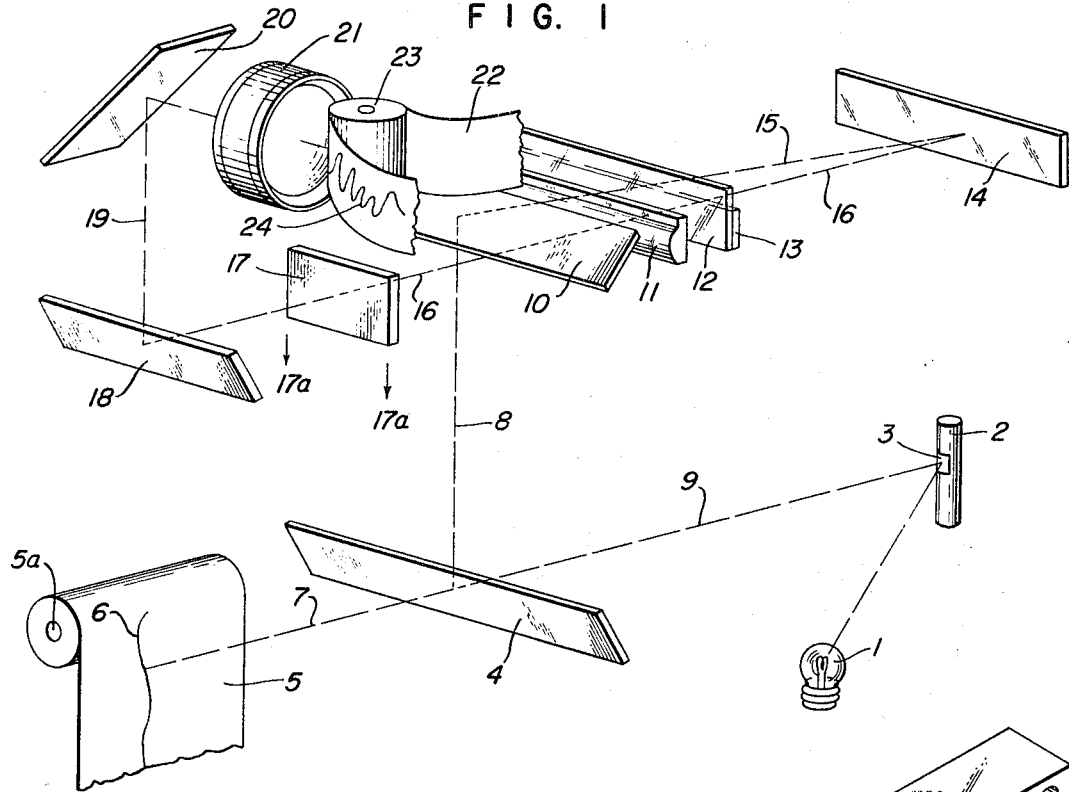

Referring now to FIGURE 1, there is shown a schematic diagram of a preferred arrangement of the optical system described hereby. There is provided light source 1 which may be any suitable source such as are used in various recording devices. Light from source 1 impinges upon a mirror 3 mounted at galvanometer 2, as is known in the art. Galvanometer mirror 3 reflects the light from source 1 along line 9. Thus, as galvanometer 2 is moved by means not shown the position of light beam 9 varies. The light from source 1 is preferably (but not limited to) a white or full spectrum light beam. As is known, this light beam bears information representative of the position of the galvanometer which is controlled by known means. Light beam 9 impinges upon a dichroic filter or beam splitter 4. Such dichroic lenses or filters are known in the art. A typical filter is produced by the Libby-Owens-Ford Glass Co. and comprises a coated element of glass bearing a dichroic coating identified as No. 90–580. This coating is designed to have substantially low absorption of visible light. The lens or filter system is further designed to reflect about 90% of the incident light having a wave length of 580 millimicrons or more. Thus, the blue and ultra-violet end of the spectrum of incident light beam 9 is transmitted as light beam 7. Light beam 7 impinges upon recording medium 5 and produces traces 6 thereon. Recording medium 5 and the associated driving system represented by shaft 5a is a typical recording medium such as is known in the art.

Since the dichroic lens is designed to reflect that light portion of light beam 9 which has a wave length of 580 millimicrons or more, namely the yellow to infrared portion of the spectrum, a light beam portion 8 is reflected thereby. Light beam 8 impinges upon the final spot mirror 10. The light beam at mirror 10 is somewhat diffused but is substantially "spotted" for further operation.

After light beam 8 is reflected by mirror 10, it passes through a typical cylindrical lens 11 which causes some conversion of the light beam. The light beam then is passed through lenticular lens 12 (see FIGURE 3). The lenticular lens has the function of controlling the scattering of the light beam transmitted thereby. That is, a normal ground glass diffuser would scatter the light passing therethrough in both the vertical and horizontal planes, as well as attenuating the light by an amount dependent upon the direction from which the light originated. On the other hand, lenticular lens 12 permits the light passed therethrough to scatter only in one plane. The scattering is controlled by the design of the lenticular lens so as to be sufficient to insure that all possible sources (or galvanometers) are within the optical field of view.

The scattered light from the lenticular lens 12 next passes through the Fresnel lens 13. A Fresnel lens is utilized to direct the light in the general direction of the final recording device or camera. In other words, the lenticular lens 12 provides images which are produced substantially between the formed surfaces of the lenticular/Fresnel lens system. The Fresnel lens operates to correct for the small amount of scattering producde by the lenticular lens and to provide substantially parallel beam outputs.

The light beam 15, after passing through the Fresnel lens, impinges upon and is reflected by a folding mirror 14 thereby producing light beam 16. Light beam 16 passes under lenses 11, 12 and 13 through a neutral filter 17 which is designed to attenuate or absorb approximately 90% of the intensity of light beam 16. Filter 17 is indicated, by means of arrows 17a, to be movable out of the path of light beam 16 as may be desired. Additional filters similar to filter 17 may be supplied. These filters may be selectively inserted into the path of light beam 16 in order to attenuate the light intensity thereof when varying speeds of operation are utilized whereby the quality and resolution of the record trace are maximized.

After passing through filter 17, light beam 16 impinges upon a further folding mirror 18 and is reflected as light beam 19 to impinge upon a third folding mirror 20. Mirror 20 redirects the light beam through a lens system 21 which may be a Pentax lens, for example the Pentax 55 mm. f/2.0 lens, in the case where recording is performed on 35 mm. film. The light beam, after passing through lens 21, impinges upon a recording medium or film 22 to form a trace 24 thereon. Film 22 may be driven by any suitable means such as capstan 23 which represents a driving capstan and means for moving same.

Figure 2:
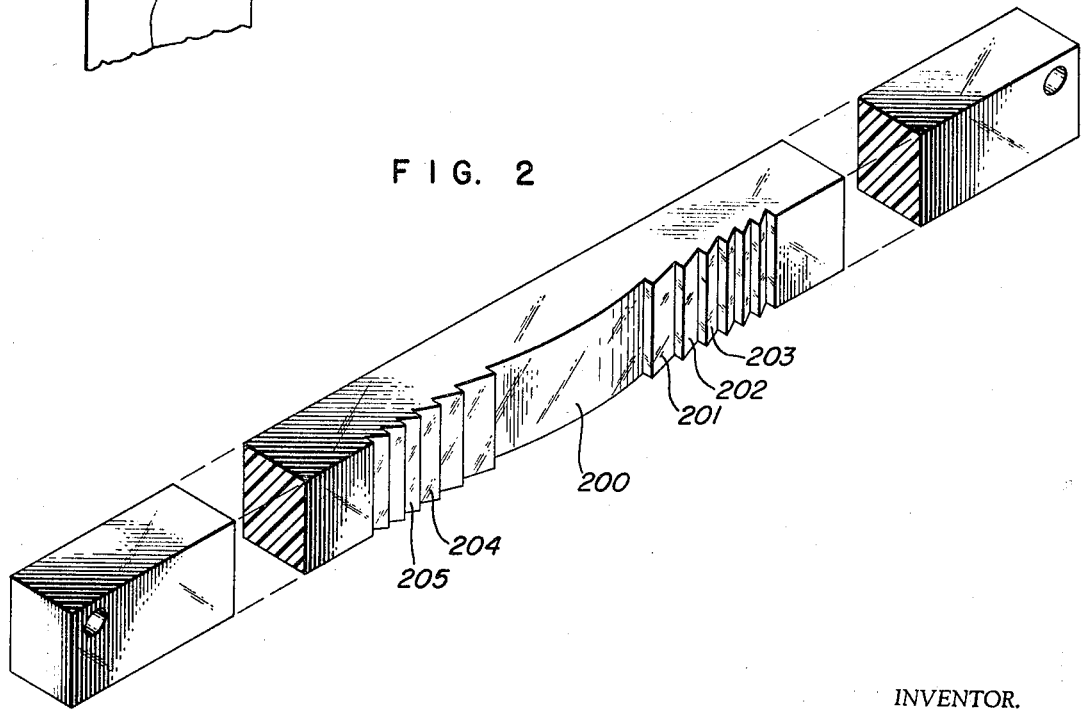
FIGURE 2 is a perspective view of a Fresnel lens.

Referring now to FIGURE 2, there is shown a perspective view of a Fresnel lens partially broken away for simplicity. It is seen that the Fresnel lens has a central portion which is substantially cylindrical or spherical as the case may be. That is, the Fresnel lens may have an elongated cylindrical configuration or it may be circular in configuration having a spherical surface 200. A plurality of lens segments 201, 202, 203, 204 and 205 have step-like portions. These segments each have a similar arcuate path defined by a slightly increasing radius. In a preferred embodiment, the transition between lens segments does not exceed 10% of segment width. Typically, the Fresnel lens may be fabricated of sheet material manufactured by Rohm and Haas and designated as "Plexiglas G" or "Plexiglas II."

Figure 3:
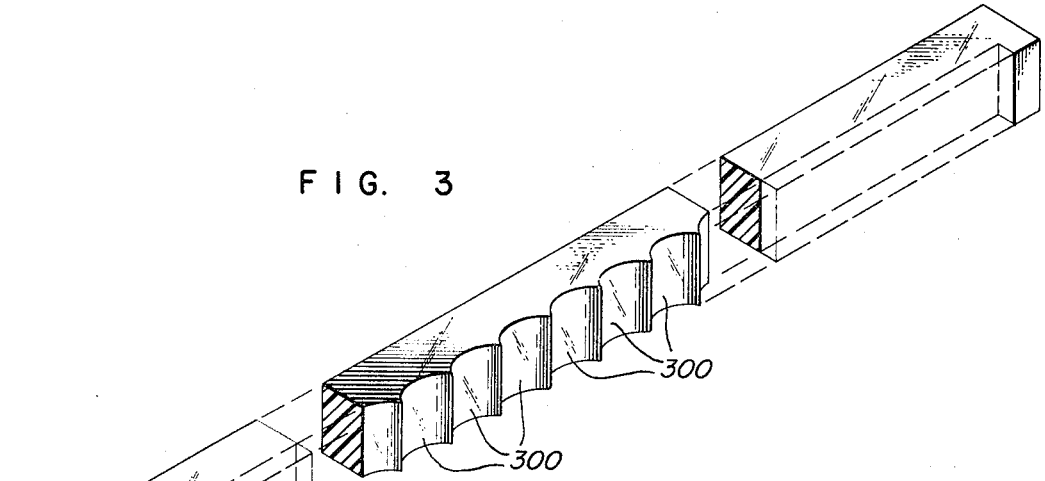
FIGURE 3 is a perspective view of a lenticular lens.

Referring to FIGURE 3, there is shown a perspective view of a lenticular lens. This lens is an elongated lens having one surface formed of a plurality of concave (or convex) lenticules. These lenticules, or cylindrical surfaces, present a smooth-polished uniform appearance. Additionally, the lenticules are oriented perpendicular to the optical axis. It should be noted that the nonformed or planar surface of lenticular lens shown in FIGURE 3 is disposed contiguous with the nonformed or planar surface of the Fresnel lens shown in FIGURE 2 when the pair of lenses are mounted in the preferred embodiment. Again, the lenticular lens shown in FIGURE 3 may be fabricated of the Rohm and Haas sheet material noted supra.

Figure 4:
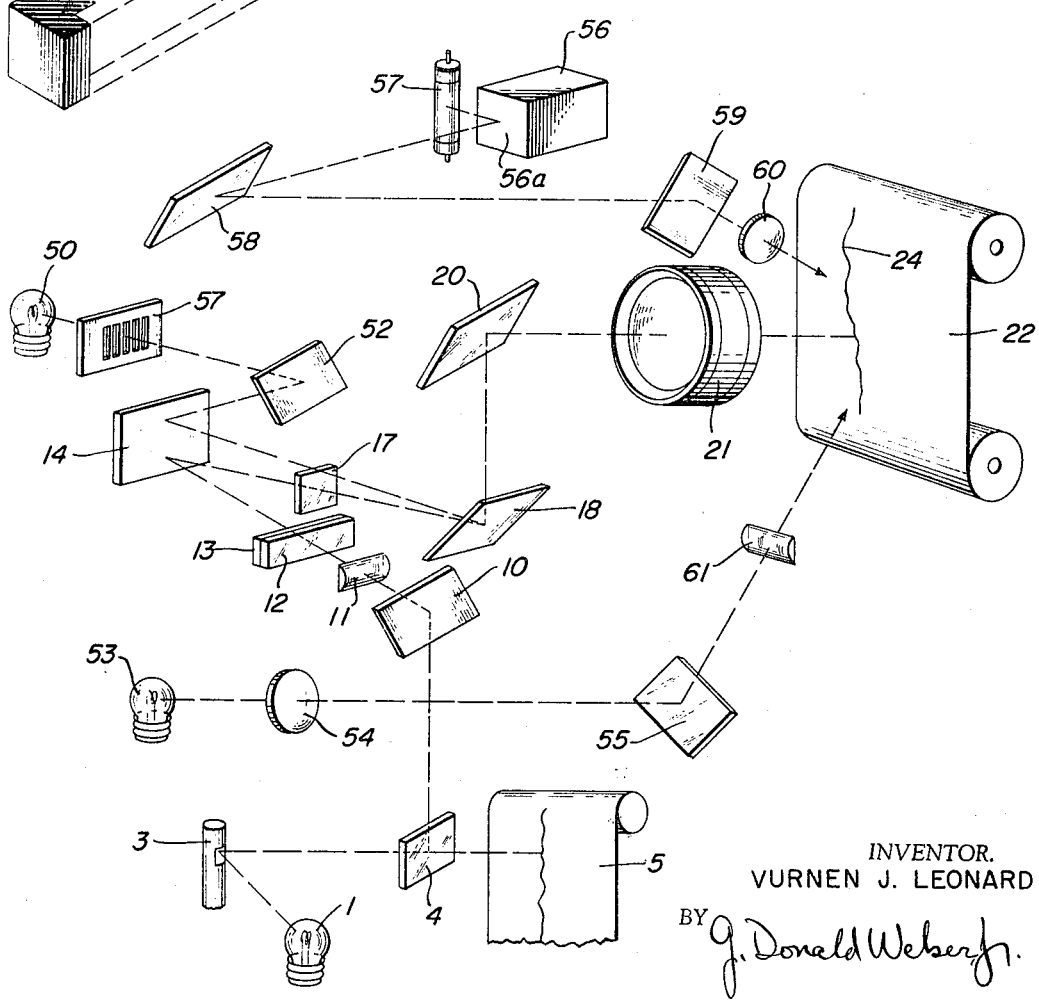
FIGURE 4 is a schematic diagram of the instant invention included in an optical recording system.

Referring now to FIGURE 4, there is shown a schematic diagram of a system wherein the novel optical system described supra is utilized. In this figure, elements which are similar to those described supra bear similar reference numerals. Thus, source 1 supplies a light beam which impinges upon a mirror carried by galvanometer 3 and which is reflected to the dichroic lens or beams splitter 4. A portion of the light beam is transmitted by beam splitter 4 and impinges upon the recording medium 5.

Another portion of the light beam is reflected to mirror 10 from whence it is directed through a cylindrical lens 11, the lenticular lens 12, and the Fresnel lens 13 to a mirror 14. From mirror 14, the light beam is reflected through a filter 17 to a mirror 18. The light beam is reflected from mirror 18 to mirror 20 from whence it is reflected through the recording lens 21 for final operation whereby a trace 24 is recorded on a recording medium such as microfilm 22.

In addition, a timing system is provided. The timing system comprises a flash tube 53 which periodically generates a light beam which passes through a suitable optical system such as a concave lens 54 and is reflected by a mirror 55 onto the microfilm 22 through a cylindrical recording lens 61. The time lines produced by this optical system will be identical to time lines which may be recorded on recording medium 5 in a separate recorder system. These lines may include frequencies up to 1,000 c.p.s. with every tenth line somewhat darker. Flash tube 53 is driven by a control circuit which may be external to the circuit and included in the separate recorder. The time lines are shown to be distinct from other traces. However, it is contemplated that the time lines may be projected into a position coincident with the galvanometer traces.

An optical record number system includes a counter 56 which is illuminated by the light supplied by flash tube 57. The light supplied by flash tube 57 is operated upon by a suitable optical system. For example, the light reflected from the counter 56 impinges upon and is reflected from mirror 58. The light beam is then reflected from mirror 59 onto the recording medium 22 through recording lens 60. In the preferred embodiment a four digit record number, as well as an instrument serial number, are recorded on the margin of the film whenever the system is operable. The flash tube and the record number counter system in the microfilm attachment may be independently controlled or may be slaved to a control system in a separate recorder device.

A system is utilized to provide grid lines on the microfilm 22. This system includes a lamp or source 50 which projects a light beam through a grid line bar 51 such as is known in the art. The light beam passes through bar 51 and is reflected by mirror 52 onto mirror 14. The light beam is reflected by mirror 14 through filter 17 onto mirror 18 substantially in the same position as the galvanometer-trace light beam. The light beam from grid line system is reflected from mirror 20 through lens 21 onto microfilm 22. Again, a separate system may be utilized or the system may be slaved to the control supplied by a separate recorder device.

Referring now to FIGURE 5, there is shown a block diagram of the system including controls therefor. There are two speed controls utilized in this system. A speed selector switch 500 may include, for example, six positions which respectively permit recording medium travel of 1 through 32 inches per second with each position doubling the next lower speed. The range selector switch 501 may include three positions with multiplying factors of 0.1, 1.0 and 10.0 as the multiplier of the speed selected by speed selector switch 500. Speed selector switch 500 is connected electrically to drive motor 508 to control the speed of operation thereof. Drive motor 508 is mechanically connected to a range transmission 509 wherein the speed of the drive motor is transmitted to a drive capstan or system 23 in accordance with a range selection according to switch 501. Switch 500 is further mechanically connected to recording lens aperture 21 via mechanical coupling 510. Speed selector switch 500, via the mechanical coupling 510, causes the recording lens aperture 21 to be stepped down by one f stop for each 50% reduction in speed. This control causes a reduction in the amount of light transmitted by lens 21 during slower speed operation. This condition avoids the undesirable blurring or blackening of the recording medium 22 when a relatively low speed operation exists.

Further controls are provided by means of range switch 501 which is electrically connected to the neutral density filters 17. Thus, for each step reduction of speed by 10 to 1 by the operation of range selector switch 501, a neutral density filter 17 is inserted in the beam path. Each of the neutral density filters 17 reduces the light transmitted by the system by 90%. Thus, it is seen that as speed is reduced by a 10:1 ratio, the intensity of the light beam is reduced by substantially the same ratio. Consequently, the net light beam intensity at the recording medium remains substantially constant.

Time line system 506 which may include a flash tube, as well as the control system therefor, supplies a signal to a flash intensity control system 507. A signal is also supplied to control 507 from speed selector switch 500. These signals control the intensity of the light beam produced by the flash tube in the time lens system. The light beam signal is passed through the timer lens 54 and projected upon film 22 to make the proper image thereon.

Similarly, record number system 504 and speed selector switch 500 supplies signals to the flash intensity control system 505. These signals cause the control to produce a light beam which is, in one embodiment, passed through the recording lens aperture 21 to form a recording number image on the microfilm 22.

Grid line system 503 and galvo system 502 each supply their signals via neutral density filters 17, through recording lens aperture 21, to produce images on recording medium 22.

Thus, there has been shown and described a system wherein a unique optical system including the configuration and arrangement of optical devices is utilized to produce an improved image in a recording device. The controls for the selective application of signals via the unique optical system are described.

The embodiments of the invention in which an exclusive property or privilege is claimed are defined as follows:

1. Apparatus for recording information including, source means for supplying an information bearing signal, means for operating upon at least a portion of said signal to control the form thereof, said means for operating including a lenticular lens and a Fresnel lens, said lenticular lens operating upon the signal portion supplied thereto in order to diffuse same in only one plane, said Fresnel lens operating upon the diffused signal to focus same in a substantially parallel configuration, means for shaping the formed signal from said means for operating, and means for recording said shaped signal.

2. The apparatus recited in claim 1 wherein said source means comprises a controllable light source wherein a light beam may be selectively varied in order to represent information, said information being represented as a function of the variation of said light source.

3. The apparatus recited in claim 2 wherein said source means includes a galvanometer mounted mirror, said mirror reflecting a light beam from said light source, said light beam being selectively positioned as a function of the position of said mirror, and said recording means comprises microfilm recording means for recording the position of said light beam therein.

4. The apparatus recited in claim 1 wherein said means for shaping comprises lens means, said lens means adapted to receive the parallel configuration signal from said Fresnel lens and focus same on said means for recording.

5. The apparatus recited in claim 1 including beam splitting means for directing one portion of said signal to said means for operating and a further portion of said signal to a second means for recording, said beam splitting means comprising dichroic lens means such that the signal portions are distinguished on the basis of the wavelength of the radiant energy of said information bearing signal.

6. The apparatus recited in claim 1 wherein filter means are selectively inserted into the path of said information bearing signal to controllably attenuate same, means for controlling the speed of operation of said means for recording, said means for controlling being operative to control the insertion of said filter means as a function of the speed of operation of said means for recording.

References Cited
UNITED STATES PATENTS

| | | | |
|---|---|---|---|
| 2,706,930 | 4/1955 | Jansen | 350—211 |
| 3,066,299 | 11/1962 | Kampf | 346—109 |
| 3,142,528 | 7/1964 | Stafford | 346—109 |
| 3,267,826 | 8/1966 | Browning | 95—18 |

RICHARD B. WILKINSON, *Primary Examiner.*

JOSEPH W. HARTARY, *Assistant Examiner.*